June 8, 1954
E. W. BUSH
2,680,646
VEHICLE WINDOW AERATOR ATTACHMENT
FOR LIVE BAIT CONTAINERS
Filed Oct. 11, 1949
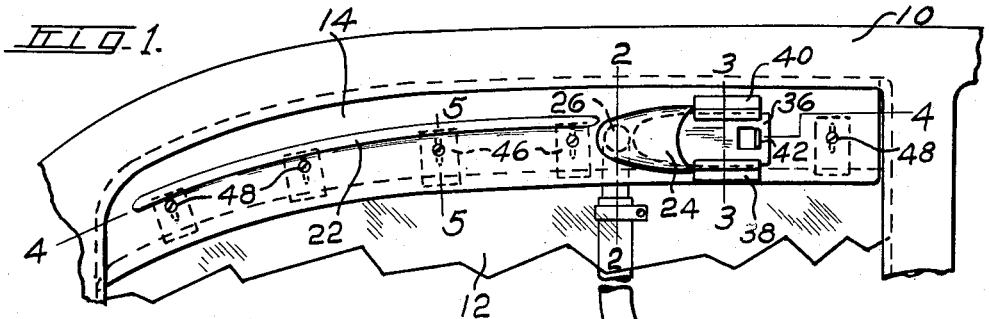
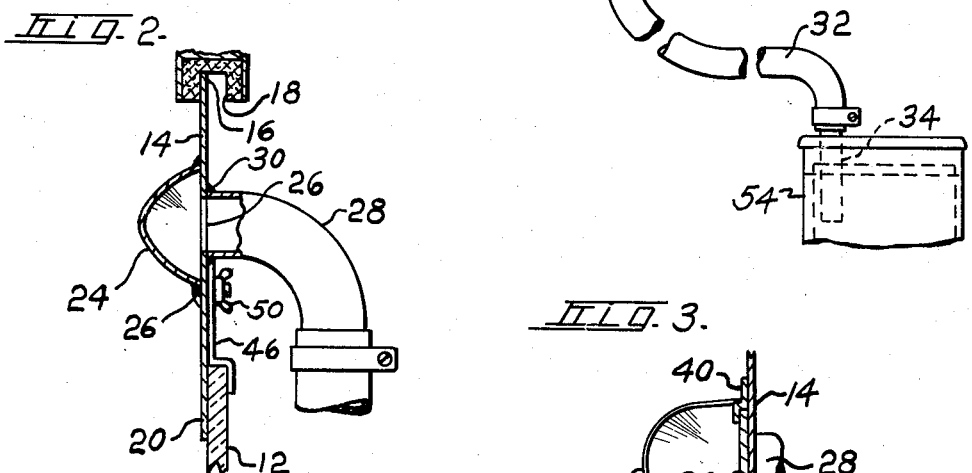
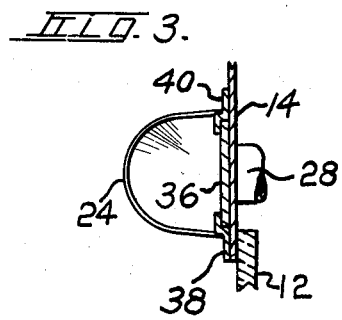
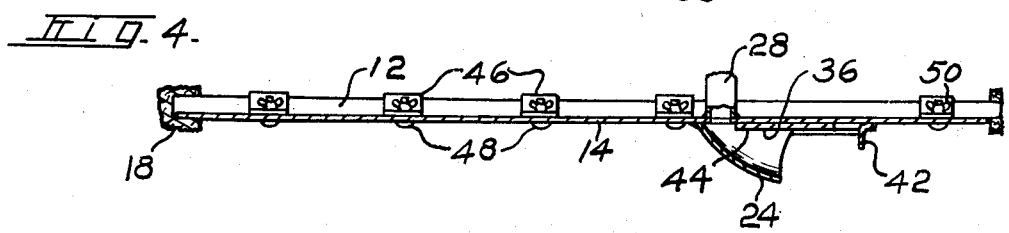
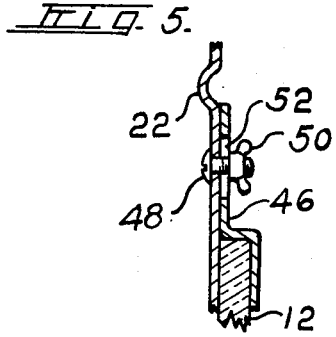
INVENTOR
ELMER W. BUSH
BY J. P. Keiper
ATTORNEY Patented June 8, 1954

2,680,646

UNITED STATES PATENT OFFICE 2,680,646

VEHICLE WINDOW AERATOR ATTACHMENT FOR LIVE BAIT CONTAINERS

Elmer W. Bush, Palmyra, N. Y.

Application October 11, 1949, Serial No. 120,739

1 Claim. (Cl. 296—44)

This invention relates to the preservation of live bait in transit, and more particularly to an aerating device adaptable to an automotive vehicle window.

In the transportation of bait from the source to the fishing grounds, which is carried on in minnow pails and the like, it has been found that unless the water is continuously aerated, the bait will die in a relatively short space of time.

The present invention is directed to the elimination of this fisherman's plague, by the provision of an aerating device which is relatively simple, easy to attach to a vehicle window and so effective to aerate the bait as to assure against suffocation even if stops in transit are required.

More particularly, it is an object of the invention to provide a window panel readily insertable and removable, upon the exterior of which is a forwardly directed air scoop, connected to a delivery tube on the interior.

The above and other objects and features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claim.

In the drawings, wherein like reference characters indicate like parts:

Figure 1 is a fragmentary side elevational view of the panel and air scoop, and connections to the live bait container;

Figure 2 is a section taken substantially on the line 2—2 of Figure 1;

Figure 3 is a section taken substantially on the line 3—3 of Figure 1;

Figure 4 is a section taken substantially on the line 4—4 of Figure 1; and

Figure 5 is a section taken substantially on the line 5—5 of Figure 1.

Referring to the drawings, there is shown the top portion of an automobile body window frame 10, in which is arranged a glass panel 12 which may be raised or lowered as will be well understood. The glass panel 12 is shown in a somewhat lowered position, to accommodate a panel 14. Such panel is provided with a marginal edge 16 at the top, of such configuration as to fit within the felt channel 18 normally provided in the top of the window frame to receive the glass pane when elevated. The panel 14 extends downwardly a sufficient distance, as at 20, to overlap the window pane 12 on the outside, so that rain and splash may drain along the outside surface of the panel. The panel may be stiffened lengthwise by a rib 22 or otherwise, as may appear desirable.

Mounted upon the exterior surface of the panel is an air scoop 24 soldered or otherwise secured to the panel as at 26, such air scoop being arranged so as to face in the direction of the movement of the vehicle. Within the air scoop 24 and located in the panel 14 is an aperture 26 to which is connected an L conduit 28 soldered or otherwise secured to the back face of the panel 14 as at 30. The conduit 28 is connected by a flexible hose 32 which may be inserted directly to a live bait container having water therein, the lower end of the conduit being submerged substantially below the water level, or connected to a tube 34 which likewise extends below the water level.

Extending within the air scoop is a manually operable slide 36 mounted in guides 38 and 40 secured to the panel 14, the slide having a struck out thumb piece 42 and being contoured at its rearward portion as at 44 to cover the aperture 26 when slid rearwardly within the scoop. By such slide, the amount of air permitted to travel down the conduit 32 may be regulated, as will appear desirable due to the varying speeds at which the vehicle may be driven.

In order to construct the panel so as to effectively fit as many window openings as possible, adjustable Z members 46 are secured to the inside surface of the panel 14 by screws 48 and thumb nuts 50, it appearing in Figures 2 and 5 that such Z members are so shaped as to fit around the top edge of the pane 12 and the inside adjacent surface. The Z member is provided with a slot 52 through which the screw 48 extends and which provides for adequate adjustment in the manner described.

It will appear that due to the channel 18, the top edge of the panel need not fit too closely to the contour of the window, but that by provision of the adjustable Z members described, a good fit may be had against the upper edge of the panel, so as to secure the panel rigidly in place.

While the panel is shown as a single member, it may be desirable to provide an extension which would overlap the rear and extend therebeyond should the panel be desired to fill an opening having a greater length than that of the window frame shown.

By such an arrangement, air may be driven down the tube 32, into the live bait container 54, with adequate force to aerate the water and thereby maintain alive minnows and other bait which may be contained within the container. In fact, the water may be so aerated as to have enough air entrained therein to permit the vehicle to be stopped for periods of time in transit without danger of injury to the live bait.

The panel may be made of transparent plastic, or metal, or other suitable material, and the parts may be likewise formed of any material having sufficient rigidity for the purpose. It will readily appear that the device is easily inserted into position in the window, that it prevents drafts to the occupants, it completing the closure, and that when the panel is not desired, it may be stowed away in a minimum of space.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

An air scoop panel for insertion into a vehicle window for supplying air under pressure to a live bait container for aeration comprising, an elongated panel adapted to be inserted in the upper part of a vehicle window frame having the window pane partially lowered, said panel having an upper edge of a configuration to engage within the channel normally adapted to receive the window pane when in closed position, said panel having a lower edge adapted to overlie exteriorly the upper edge of a partially lowered window pane, a plurality of Z-members secured to the inside surface of said panel in spaced relation along the length thereof and adjacent said lower edge, said Z-members being adjustable toward and away from said edge and adapted to embrace the upper edge and marginal inside surface of said window pane, a single air scoop mounted on the exterior of said panel adjacent the forward end thereof, said scoop being open toward the forward end of the panel and closed at the other end, said panel having a small aperture therethrough located within the scoop near the closed end thereof, a fitting in the form of a nipple on the interior side of said panel secured in said aperture adapted to be connected by a conduit to a live bait container for aerating the water therein, and a manually adjustable slide valve plate mounted on the exterior of said panel having an aperture-covering tongue projecting into said scoop, and guideways along opposite edges of said plate secured to said panel forward of said scoop, whereby said plate may be slid toward or away from said scoop to position said tongue in valve-controlling relation to said aperture.

References Cited in the file of this patent

UNITED STATES PATENTS

| Number | Name | Date |
| --- | --- | --- |
| 1,256,377 | Salles | Feb. 12, 1918 |
| 1,457,959 | Braucher | June 5, 1923 |
| 1,643,279 | Kress et al. | Sept. 20, 1927 |
| 1,728,777 | Trier | Sept. 17, 1929 |
| 1,750,789 | Thompson | Mar. 18, 1930 |
| 1,991,149 | Haislip | Feb. 12, 1935 |
| 2,330,870 | Collier | Oct. 5, 1943 |
| 2,576,503 | Dean | Nov. 27, 1951 |